United States Patent
Schaller

(10) Patent No.: US 6,956,938 B1
(45) Date of Patent: Oct. 18, 2005

(54) ELECTRONIC DEVICE AND METHOD FOR OPERATING

(75) Inventor: Nikolaus Schaller, Deisenhofen (DE)

(73) Assignee: Siemens Aktiengesellschaft, Munich (DE)

( * ) Notice: Subject to any disclaimer, the term of this patent is extended or adjusted under 35 U.S.C. 154(b) by 300 days.

(21) Appl. No.: 10/019,403

(22) PCT Filed: Jun. 28, 2000

(86) PCT No.: PCT/DE00/02105

§ 371 (c)(1),
(2), (4) Date: Dec. 28, 2001

(87) PCT Pub. No.: WO01/01658

PCT Pub. Date: Jan. 4, 2001

(30) Foreign Application Priority Data

Jun. 29, 1999 (DE) .................................. 199 29 757

(51) Int. Cl.[7] .............................................. H04M 3/42
(52) U.S. Cl. ................ 379/201.04; 345/810; 345/811; 455/566
(58) Field of Search .................. 379/201.04; 345/810, 345/811; 455/566

(56) References Cited

U.S. PATENT DOCUMENTS

| | | | |
|---|---|---|---|
| 5,420,975 A | 5/1995 | Blades et al. | 345/811 |
| 5,561,753 A | 10/1996 | Coulombe et al. | 345/835 |
| 5,821,936 A | 10/1998 | Shaffer et al. | 345/810 |
| 6,144,863 A | 11/2000 | Charron | 455/566 |

FOREIGN PATENT DOCUMENTS

| | | |
|---|---|---|
| DE | 42 43 563 | 6/1994 |
| DE | 197 53 853 | 2/1999 |
| EP | 607 731 | 7/1994 |
| EP | 808 049 | 11/1997 |
| EP | 844 553 | 5/1998 |
| EP | 891 066 | 1/1999 |

OTHER PUBLICATIONS

Patent Abstracts of Japan, vol. 1999, No. 10, Japanese Published Patent Application 11-134155A, Aug. 31, 1999.

*Primary Examiner*—Ahmad F. Matar
*Assistant Examiner*—Quynh H. Nguyen
(74) *Attorney, Agent, or Firm*—Staas & Halsey LLP

(57) ABSTRACT

An electronic device, particularly a telephone terminal, with an input device and a display or output device has at least one supplementary or selection function which can be activated via the input device. Each activation of a particular supplementary or selection function is detected and the result of the detection is subjected to a predetermined evaluation with a predetermined text being displayed or output in dependence on the result of the evaluation.

15 Claims, 2 Drawing Sheets

ELECTRONIC DEVICE AND METHOD FOR OPERATING

CROSS REFERENCE TO RELATED APPLICATIONS

This application is based on and hereby claims priority to German Patent Application No. 19929757.6 filed on Jun. 29, 1999, the contents of which are hereby incorporated by reference.

BACKGROUND OF THE INVENTION

1. Field of the Invention

The invention relates to a method for operating an electronic device

2. Description of the Related Art

Electronic devices for commercial or private use—including, in particular, telephone terminals but also devices from the field of so-called consumer electronics, i.e. audio and video devices, cameras, organizers etc.—are nowadays increasingly provided with supplementary functions which go beyond the functionality necessary for the operation and are intended to offer advantages in serviceability to the user in order to increase the marketing chances. In many cases, the implementation of such supplementary functions is associated with considerable development and cost expenditure.

In the practical use of such electronic devices with supplementary functionality, however, little utilization of the supplementary functions can be registered in many cases so that the possible advantages of serviceability are not actually realized by the user. One of the causes of this—if not the most important one—can be seen in the fact that the supplementary functions in question are not known to the user at all or if at all, then only as catchphrases, i.e. without any real understanding of their operation and the useful effects that could be achieved by them. In this connection, the psychological effect is also of significance that sometime after the purchase of a new device, the interest in functions going beyond the basic functions clearly diminishes and the supplementary functions not intensively used in the first phase of utilization are increasingly forgotten and are later no longer activated at all.

Especially in the case of modern telephones, both in line-connected feature telephones and in cordless and mobile telephones, a large number of supplementary functions is implemented in order to satisfy the requirements of sophisticated users. These are the following functions, for example:

last number redialling
internal calls
electronic directory
macros
barring
pocket money account
office codes
temporary PD/DTMF switching
call groups
MSN in ISDN
CLIP functions
inquiry, toggling etc.

Most of the users do not, however, know and use all or not even the most essential supplementary functions. Thus, there is great technical expenditure on functions which, in the final analysis, are little used and the possible advantages in serviceability are not realized.

As a rule, the supplementary functions are listed and explained in operating instructions of the device being discussed (for example of the telephone). Such operating instructions are in many cases of unsatisfactory structure and formulation and, therefore, are not or only superficially read by many users. In the daily use of the device, moreover, they are not continuously available to the user and, in conjunction with the abovementioned diminishing of interest in the functions of the device with increasing length of ownership, the operating instructions are no longer being used at all after some time. Thus, the operating instructions are not a suitable means for moving the user to explore the functions of his device in detail.

SUMMARY OF THE INVENTION

The invention is based, therefore, on the object of specifying a method for operating an electronic device and an electronic device which, in particular, implements this method and by which a more efficient utilization of the functions of the device can be achieved.

The invention includes the fundamental technical concept of detecting the activation of functions offered and evaluating the result of the detection in the device. It also includes the concept of displaying or outputting references to functions not used or used only little, in dependence on the result of the evaluation.

The results of the detection are preferably evaluated as logging of the frequency of use, i.e. the number of activations within a particular period (calendar period or period related to the switch-on times of the device), and a counter connected to the operating element for the respective function, in conjunction with a timer, can be used for this purpose.

In a further advantageous embodiment, it is also possible to evaluate a trend of whether and to what extent the frequency of use of a particular function has changed within predetermined periods.

The reference to the little used functions is made in a simple and appropriate manner by pre-programmed short advisory texts which are displayed on an alphanumeric display of the device, which exists in any case, and/or also printed out with hard copy records and/or conveyed audibly. The advisory texts can contain, in particular, references to the operating instructions or other information sources. The advisory text output can also be selected in dependence on how the pattern of use evolves—in conjunction with the trend evaluation addressed above; for example, the user can be encouraged to use a function not previously used by a suitable text selection after the first attempts, or otherwise the advantages of the function in question can be selectively pointed out to him when a drop in frequency of use is registered.

As examples of application for linking certain evaluation results with regard to the supplementary functions of a modern telephone to references directed to the user, the following can be mentioned:

no call number memory occupied→explanation of the call number memories no telephone directory entries→explanation of the telephone directory concept last number redialling never used→text: "Do you know that it is possible to dial the last number from the last number redialling memory? If no, please refer to page 7 of the operating instructions"

mobile part never barred→reference to PIN input
only one mobile part logged into one DECT base station→reference to additional mobile parts
no internal call set up→reference that internal calls by other mobile parts are free of charge The invention also provides for evaluating the frequency of use of selection functions and possibilities offered by the device, in addition to supplementary functions in the narrower sense. This can be, in particular, an evaluation of the frequency with which a particular call partner has been dialled from the electronic telephone directory. As a result of the evaluation, a particular advisory text can be generated here, too, which, for example, encourages a more frequent contacting of the corresponding subscriber or a reestablishment of contact after a prolonged period. In this sense, the invention also provides the possibility of implementing an "automatic relationship manager".

The device constructed for carrying out the invention exhibits a supplementary or selection function detection device, an evaluation device for evaluating the frequency of activation of the supplementary or selection function(s), a user information memory and a display or output control device for initiating the output of the advisory texts mentioned. In a further development of the device aspect, the evaluation device can exhibit the counter mentioned above and timer and optionally other counters and/or arithmetic calculating units for providing results of the evaluation or trend information relating to different periods.

Moreover, advantages and suitable applications of the invention are obtained from the subclaims and the subsequent description of preferred exemplary embodiments, referring to the figures, in which:

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
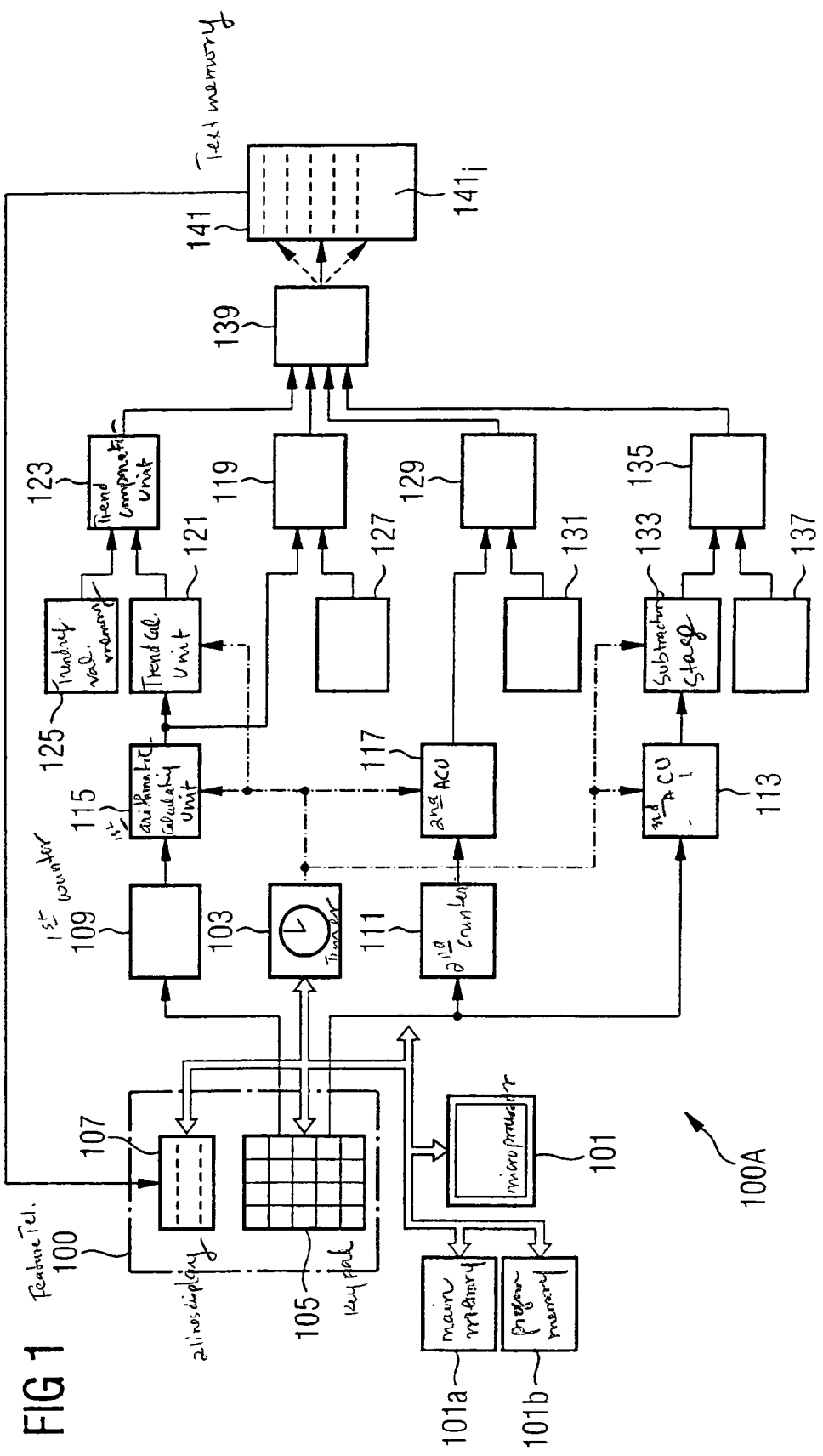
FIG. 1 is a functional block diagram of components of a feature telephone according to a first embodiment of the invention.

Reference will now be made in detail to the preferred embodiments of the present invention, examples of which are illustrated in the accompanying drawings, wherein like reference numerals refer to like elements throughout.

FIG. 1 shows a basic representation in the form of a functional block diagram of an system 100A, implemented as part of a feature telephone 100, according to a first embodiment of the invention. The feature telephone exhibits a microprocessor 101 which is associated in the usual manner with a main memory 101a, a program memory 101b and a timer 103. The telephone 100 has an input keypad 105 and a two-line alphanumeric display unit 107.

In the text which follows, the embodiment of the invention is explained with the example of two selected functions of the telephone 100, namely (a) with respect to the "last number redialling" function and (b) with respect to the frequency of contacting of a call partner entered in the electronic telephone directory.

The last number redialling key of the input keypad 105 is connected to a first counter 109 and the speed dialling input element specified for the call partner mentioned is connected to a second counter 111. The counters 109 and 111 count the number of activations of the "last number redialling" function and of the establishment of contact with the specific call partner. A FIFO memory 113 is also connected to the last-mentioned input element and is also connected via a further input to the timer 103 and in which the last (calendar) time of the establishment of contact with the call party mentioned is in each case stored. The output of the first counter 109 is connected to a first arithmetic calculating unit 115 and the output of the second counter 111 is connected to a second arithmetic calculating unit 117. The first and second calculating unit 115, 117 is in each case also connected to the timer 103 and calculates the frequency of activation of the "last number redialling" function and of the frequency with which the specified call party has been dialled within a predetermined period. This period is stored in the main memory 101a and the calculation process and also the sequences explained subsequently are executed in accordance with program sequences stored in the program memory 101b.

The output of the first calculating unit 115 is connected, on the one hand, to a first frequency comparator unit 119 and, on the other hand, to the input of a third arithmetic calculating unit (trend calculating unit) 121. The trend calculating unit 121—like the first and second arithmetic calculating unit, too—is also connected to the timer 103 and is controlled by the microprocessor 101. As its name indicates, it is used for determining a trend of the frequency of use of the "last number redialling" function over predetermined successive periods. The output of the trend calculating unit 121 is connected to a first input of a trend comparator unit 123, the second input of which is connected to a trend reference value memory 125. Similarly, a first frequency reference value memory 127 is connected to a second input of the abovementioned first frequency comparator unit 119.

The output of the second arithmetic calculating unit 117, too, is connected to one input of a (second) frequency comparator unit 129, the second input of which is connected to a (second) frequency reference value memory 131. The output of the FIFO memory 113 is connected to a subtraction stage 133 which is also connected to the timer 103 and calculates the time difference between the current date and the date of the last speed dialling to the specific call party. The substraction stage 133 is followed in the circuit by a time difference comparator unit 135, the second input of which is connected to a time difference reference value memory 137.

The comparator units 119, 123, 129 and 135 mentioned, in interaction with their associated reference value memories 125, 127, 131 and 137, are used for determining whether the respective input value (frequency of use, trend value of use and time difference value, respectively) exceeds or drops below a predetermined threshold value, and for outputting an output signal characterizing the result of the comparison. All of them are connected to inputs of a memory control unit 139 which is connected to a text memory (user information memory) 141 and—naturally again under control by the microprocessor 101—calls up predetermined advisory texts stored in the various memory areas 141i of the text memory 141 in dependence on these respective output signals and displays them on the display unit 107 of the telephone 100.

Thus, for example during the determination of a frequency of use of the "last number redialling" function dropping below a particular reference frequency and/or having a falling trend (and, in particular, naturally, when this function is not used at all), a reference to the advantages of this function is displayed in the display 107. If no connection with the specified call party has been established over a predetermined period (time difference reference value) and/or if the frequency of the establishment of contact with this party drops below a predetermined reference value, a specific reference to the suitability of re-establishing contact with this party (for example an important business partner) is in each case displayed on the display 107.

Similar to what has been described above, time difference, frequency or trend evaluations with respect to the use of other functions of the telephone 100 can be performed and specific advisory texts can be displayed in each case as a result of the evaluation. In the case of a telephone system with hard copy reports, it is also possible to print out the corresponding references and, finally, a text announcement can also be implemented (particularly suitable in the case of a telephone with answering machine function). For the embodiment in a feature telephone outlined in FIG. 1, the use of calendar periods (days/weeks/months) without referring to a device operating period or real period of use is appropriate. Naturally, this embodiment is also possible in the same way in a cordless telephone or mobile telephone.

Figure 2:
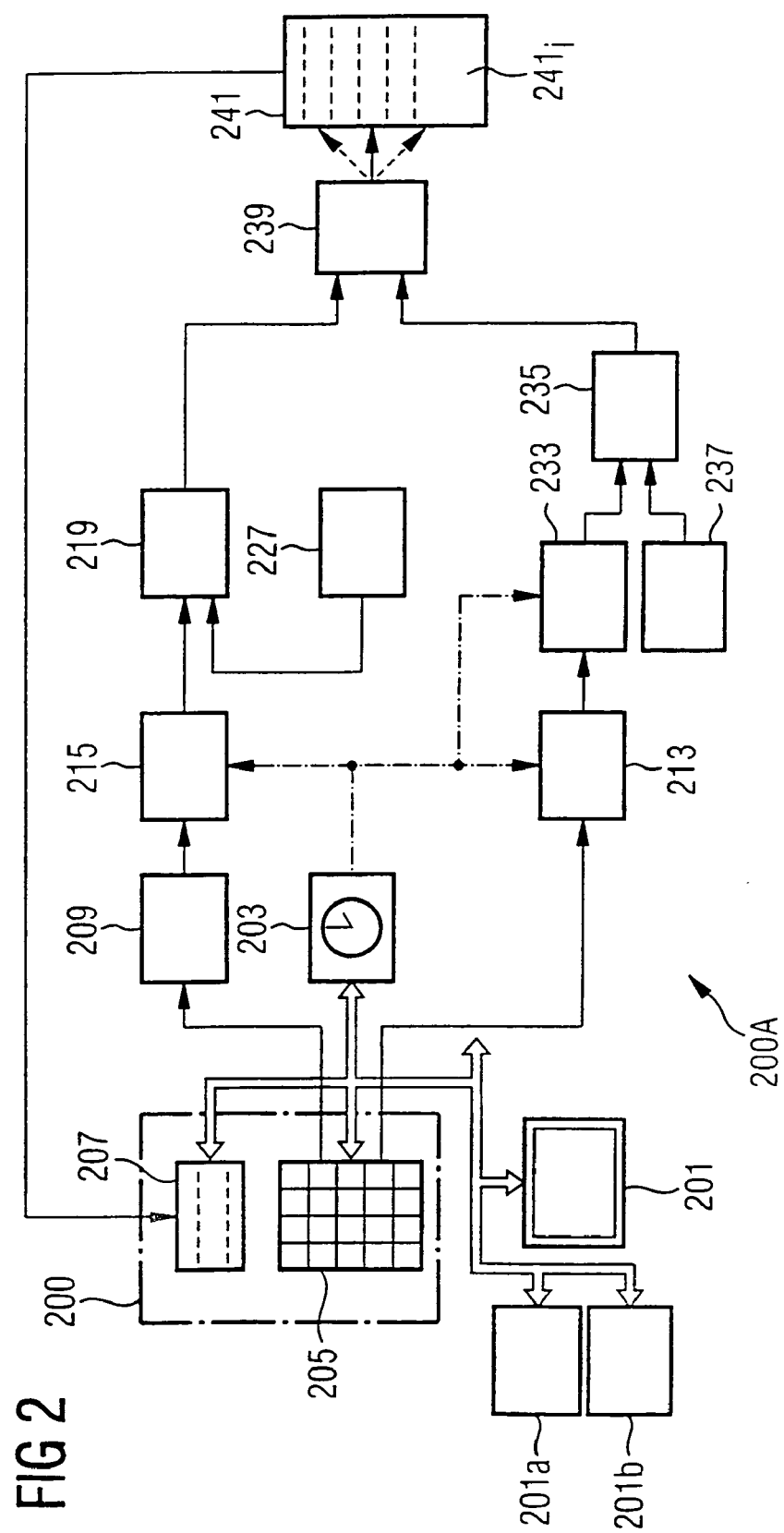
FIG. 2 is a functional block diagram of components of a car radio/CD changer combination according to a second embodiment of the invention.

FIG. 2 shows the embodiment of the invention in another field than that of communications engineering with the example of a car radio/CD changer combination. Here, too, only the components which are of importance in conjunction with the explanation of the invention are shown; for the rest, a conventional device configuration is assumed. The functional components of this system largely correspond to those of the first embodiment and are designated to this extent with reference numbers derived from FIG. 1 and will not be explained again in the text which follows.

As examples of supplementary functions enhancing the value of use, (a) the "random" function (mixing the titles of a CD in accordance with the principle of randomness) and (b) selection of various CDs from the changer will be picked out here and an evaluation will be described which is simplified as compared with the evaluation modes of the first embodiment. (Due to this fact and due to the circumstances that components having similar functions should also receive similar reference numbers as in FIG. 1, the reference numbers in FIG. 2 no longer follow one another without gaps.)

The car radio/CD changer combination 200 has a microprocessor 201, which is also used for controlling the program sequence, a main and program memory 201a, 201b and a timer 203 and naturally an operating keypad 205 and an alphanumeric display unit 207 in the usual manner and in principle analogously to the feature telephone according to FIG. 1. A first group of essential elements of system 200A for carrying out the invention are in this case a counter 209, connected to the operating keypad 205, for counting the operating processes for activating the "random" function, an arithmetic calculating unit 215, which follows the counter 209 and is also connected to the timer 203, for calculating the relative frequency of use of the said function, a frequency comparator unit 219 which is connected to the output of the calculating unit 215 and to the second input of which a frequency reference value memory 227 is connected.

A second group of essential functional components is formed by a FIFO memory 213, which is connected, on the one hand, to the input keypad 205 and, on the other hand, to the timer 203, for registering the last selection process in each case for a particular CD position in the changer part, a subtraction stage 233, connected to the output of the FIFO memory 213 and also to the timer 203, for determining the period which has elapsed since the last corresponding selection process, a time difference comparator unit 235 connected to the output of the subtraction stage 233 and a time difference reference value memory 237 connected to its second input. With regard to the remaining components of memory control unit 239 and text memory 241, reference is made to the above description for FIG. 1.

Thus, in the system described last, the user of the car radio/CD changer combination 200 is supplied with corresponding references via the display 207 when he has not or very rarely used the "random" function of his device within a predetermined operating period or when he has not selected a particular CD in the changer for a very long time. The latter reference can provide him with a stimulus for inserting another CD into this compartment which is more to his (possibly changed) taste.

The invention has been described in detail with particular reference to preferred embodiments thereof, but is not restricted to the examples described. It will be understood that variations and modifications can be effected within the spirit and scope of the invention, in a multiplicity of modifications for other devices and applications.

What is claimed is:

1. A method for operating an electronic device, having an input unit, at least one output unit, and at least one supplementary or selection function activatable via the input unit, said method comprising:
   detecting each activation of a predetermined supplementary or selection function;
   evaluating a result of said detecting using a predetermined evaluation, which compares input values based on the detected activations against a threshold value, for determining at least one of infrequently used supplementary and selection functions; and
   outputting reference advisory text corresponding to the at least one of infrequently used supplementary and selection functions based on said evaluating.

2. The method as claimed in claim 1, wherein the electronic device is a telephone terminal with a display, and
   wherein said evaluating includes determining a frequency of activation of the at least one of infrequently used supplementary and selection functions in a predetermined period.

3. The method as claimed in claim 2, wherein said evaluating includes determining a trend of the frequency of activation in the predetermined period.

4. The method as claimed in claim 3, wherein said evaluating includes determining a period which has elapsed since a most recent activation of the at least one of infrequently used supplementary and selection functions.

5. The method as claimed in claim 4, wherein said evaluating includes comparing a predetermined reference value with at least one of frequency of activation, the trend determined and the period determined.

6. The method according to claim 1, wherein the advisory text is an operating instruction.

7. The method according to claim 1, wherein the outputting the advisory text comprises printing a record of the text or audibly outputting the text.

8. The method according to claim 1, wherein the supplementary or selection function is a random function.

9. An electronic device, comprising:
- an input unit to activate at least one supplementary or selection function;
- an output unit;
- a supplementary function detection unit to detect each activation of a particular supplementary or selection function and to produce a detection output;
- a timer, coupled to said supplementary function detection unit, to determine a quantity characterizing a number of activations of the particular supplementary or selection function in a predetermined period;
- an evaluation unit, coupled to said supplementary function detection unit and said timer, which compares input values based on the detected activations against a threshold value, to produce an evaluation output;
- a user information memory, coupled to said output unit, to store at least one advisory text for at least one infrequently used supplementary or selection function; and
- a memory control unit, coupled to said evaluation unit and said user information memory, to address said user information memory for output of a corresponding advisory text for each infrequently used supplementary or selection function, based on the evaluation output.

10. The device as claimed in claim 9, wherein the electronic device is a telephone terminal with a display, and wherein said supplementary function detection unit includes
- a counter to detect the number of activations of the particular supplementary or selection function; and
- an arithmetic calculating unit, coupled to said counter and said timer, to determine a frequency of activation of the particular supplementary or selection function in the predetermined period.

11. The device as claimed in claim 10, wherein said evaluation unit includes
- a last activation memory to store a last activation time of the particular supplementary or selection function; and
- a subtraction stage, connected to said last activation memory and to said timer, to determine a period which has elapsed since the last activation time.

12. The device as claimed in claim 11, wherein said evaluation unit further includes:
- a reference value memory to store a predetermined period; and
- a comparator unit, having an input coupled to said reference value memory and an output coupled to said memory control unit, to compare the quantity characterizing the number of activations to the predetermined period and to output a control signal to said memory control unit.

13. The device according to claim 9, wherein the advisory text is an operating instruction.

14. The device according to claim 9, wherein the outputting the advisory text comprises printing a record of the advisory text or audibly outputting the advisory text.

15. The device according to claim 9, wherein the device is a CD player or radio and the supplementary or selection function is a random function.

* * * * *